(12) United States Patent  
Tsunaki et al.

(10) Patent No.: US 9,923,186 B2  
(45) Date of Patent: Mar. 20, 2018

(54) RECTANGULAR SECONDARY BATTERY

(71) Applicant: HITACHI AUTOMOTIVE SYSTEMS, LTD., Hitachinaka-shi, Ibaraki (JP)

(72) Inventors: Takuro Tsunaki, Hitachinaka (JP); Shou Saimaru, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 32 days.

(21) Appl. No.: 15/026,790

(22) PCT Filed: Oct. 25, 2013

(86) PCT No.: PCT/JP2013/079008  
§ 371 (c)(1),  
(2) Date: Apr. 1, 2016

(87) PCT Pub. No.: WO2015/059826  
PCT Pub. Date: Apr. 30, 2015

(65) Prior Publication Data  
US 2016/0254517 A1    Sep. 1, 2016

(51) Int. Cl.  
*H01M 2/00* (2006.01)  
*H01M 2/30* (2006.01)  
(Continued)

(52) U.S. Cl.  
CPC ............. *H01M 2/305* (2013.01); *B23K 26/32* (2013.01); *B29C 65/16* (2013.01); *H01M 2/22* (2013.01);  
(Continued)

(58) Field of Classification Search  
CPC ..................................................... H01M 2/00  
See application file for complete search history.

(56) References Cited

U.S. PATENT DOCUMENTS

2003/0104276 A1    6/2003  Mizuno et al.  
2011/0064993 A1    3/2011  Ochi  
(Continued)

FOREIGN PATENT DOCUMENTS

EP    2 312 675 A1    4/2011  
JP    2003-045408 A    2/2003  
(Continued)

OTHER PUBLICATIONS

The Extended European Search Report dated Mar. 20, 2017 in the EP Application No. 13896034.9.

*Primary Examiner* — Jacob Marks  
(74) *Attorney, Agent, or Firm* — Volpe and Koenig, P.C.

(57) ABSTRACT

A square secondary battery includes a can housing a power generation element, a lid sealing an opening of the can, an external terminal arranged on the lid, a current collector connected to each of the electrodes of the power generation element, and a connection terminal connecting the current collector and the external terminal by passing through the lid. The external terminal has a flat plate shape arranged along the lid and is made of a clad material in which two flat plate portions made of mutually dissimilar metals are clad-joined on wide-width surfaces and the connection terminal is joined by welding with, of the two flat plate portions of the external terminal, the flat plate portion arranged on a side of the lid.

5 Claims, 14 Drawing Sheets

(51) Int. Cl.
*H01M 2/22* (2006.01)
*B29C 65/16* (2006.01)
*B23K 26/32* (2014.01)
*H01M 2/06* (2006.01)

(52) U.S. Cl.
CPC ............... *H01M 2/30* (2013.01); *H01M 2/06* (2013.01); *H01M 2220/20* (2013.01)

(56) References Cited

U.S. PATENT DOCUMENTS

2011/0244308 A1   10/2011  Byun et al.
2011/0244309 A1*  10/2011  Byun .................... H01M 2/043
                                                                429/158
2012/0321943 A1   12/2012  Ito

FOREIGN PATENT DOCUMENTS

| JP | 2003-173767 A | 6/2003 |
| JP | 2003-272574 A | 9/2003 |
| JP | 2011-060623 A | 3/2011 |
| JP | 2011-210720 A | 10/2011 |
| JP | 2013-020944 A | 1/2013 |
| WO | 2012/169055 A1 | 12/2012 |

* cited by examiner

RECTANGULAR SECONDARY BATTERY

TECHNICAL FIELD

The present invention relates to a square secondary battery.

BACKGROUND ART

In recent years, large-capacity (Wh) secondary batteries have been developed as power sources of hybrid electric vehicles or pure electric vehicles and among others, square lithium ion secondary batteries with a high energy density (Wh/kg) have attracted attention.

In a square lithium ion secondary battery, a flat wound electrode group is formed as a power generation element by stacking up and winding a positive electrode in which positive electrode foil is coated with a positive electrode active material, a negative electrode in which negative electrode foil is coated with a negative electrode active material, and a separator to insulate the positive electrode and the negative electrode. The wound electrode group is electrically connected to a positive electrode external terminal and a negative electrode external terminal provided on a battery lid of a battery container. The wound electrode group is housed in a battery can of the battery container and an opening of the battery can is sealed with the battery lid and welded. A square secondary battery is formed by injecting an electrolytic solution through an injection hole of the battery container and then blocking off the injected solution by an injection tap and sealing by laser welding.

A battery module is formed by electrically connecting the positive electrode external terminal and the negative electrode external terminal of a plurality of square secondary batteries using a conductive member such as a bus bar. The bus bar is connected to the square secondary battery by being screwed onto an external terminal using a bolt and a nut or welded to the external terminal.

In PTL 1, an external terminal connecting a plurality of secondary batteries and formed from a clad material made of aluminum and nickel and a connection terminal (electrode led pin in PTL 1) made of aluminum from inside the secondary battery are provided. The secondary battery described in PTL 1 is fixed by caulking to the connection terminal joined with a power generation element on the nickel side of the external terminal.

In PTL 2, a plurality of square secondary batteries is connected by a bus bar being welded to the external terminals, each external terminal to be connected is made of an alloy of aluminum and copper, and the bus bar includes a clad material in which an aluminum alloy and a copper alloy are joined as dissimilar metals. The bus bar described in PTL 2 has an aluminum alloy and a copper alloy are butt-joined on narrow-width surfaces and the aluminum alloy of the bus bar and the connection terminal made of the aluminum alloy are welded to the copper alloy of the bus bar and the connection terminal made of the copper alloy for connection.

CITATION LIST

Patent Literatures

PTL 1: JP 2003-045408 A
PTL 2: JP 2011-060623 A

SUMMARY OF INVENTION

Technical Problem

The secondary battery described in PTL 1 is electrically connected to the connection terminal joined with the power generation element and made of the aluminum alloy by caulked fixing on the nickel side of the clad external terminal in which dissimilar metals of the aluminum alloy and nickel change and therefore, the contact resistance is large and may change over a long period of time.

The secondary battery described in PTL 2 is a secondary battery in which the bus bar is connected to the external terminal by welding and includes the external terminal made of the aluminum alloy and copper alloy and the bus bar to connect to another secondary battery is a clad bus bar in which dissimilar metals of the aluminum alloy and copper alloy in a flat plate shape are changed on narrow width surfaces (end faces are clad-joined) and therefore, the junction resistance of a dissimilar metal change portion of the aluminum alloy and copper alloy could become large.

The present invention is made in view of the above circumstances and an object thereof is to provide a square secondary battery whose external terminal is formed in a simple structure and capable of reducing the contact resistance of joints of a connection terminal and the external terminal and the junction resistance of a dissimilar metal change portion of the external terminal.

Solution to Problem

A square secondary battery to solve the above problem includes a power generation element including electrodes, a can housing the power generation element, a lid sealing an opening of the can, an external terminal arranged on the lid, a current collector connected to the electrodes of the power generation element, and a connection terminal connecting the current collector and the external terminal by passing through the lid, wherein the external terminal has a flat plate shape arranged along the lid and is made of a clad material in which two flat plate portions made of mutually dissimilar metals are clad-joined on wide-width surfaces and the connection terminal is joined by welding with, of the two flat plate portions of the external terminal, the flat plate portion arranged on a side of the lid.

Advantageous Effects of Invention

According to the present invention, a square secondary battery whose external terminal is formed in a simple structure and capable of reducing the contact resistance of a connection terminal and the external terminal made of a clad material and the junction resistance of a dissimilar metal change portion of the external terminal made of the clad material can be provided.

DESCRIPTION OF EMBODIMENTS

First Embodiment

Hereinafter, an embodiment of the square secondary battery according to the present invention will be described with reference to the drawings.

Figure 1:
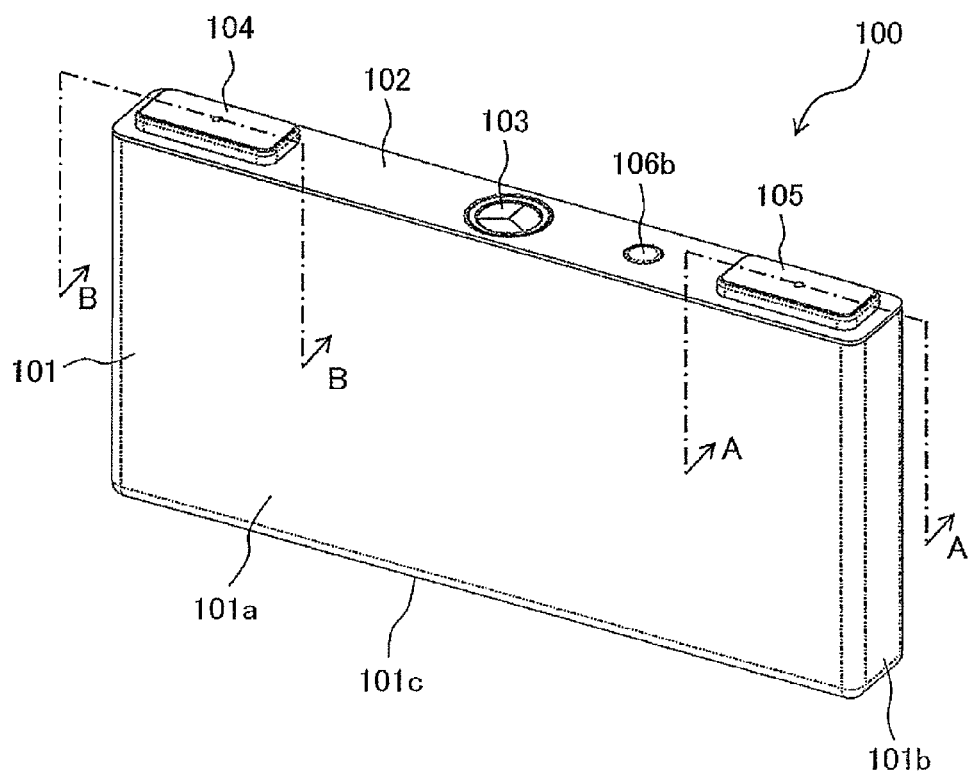
FIG. 1 is an appearance perspective view of a square secondary battery as a first embodiment of the square secondary battery of the present invention.
Figure 2:
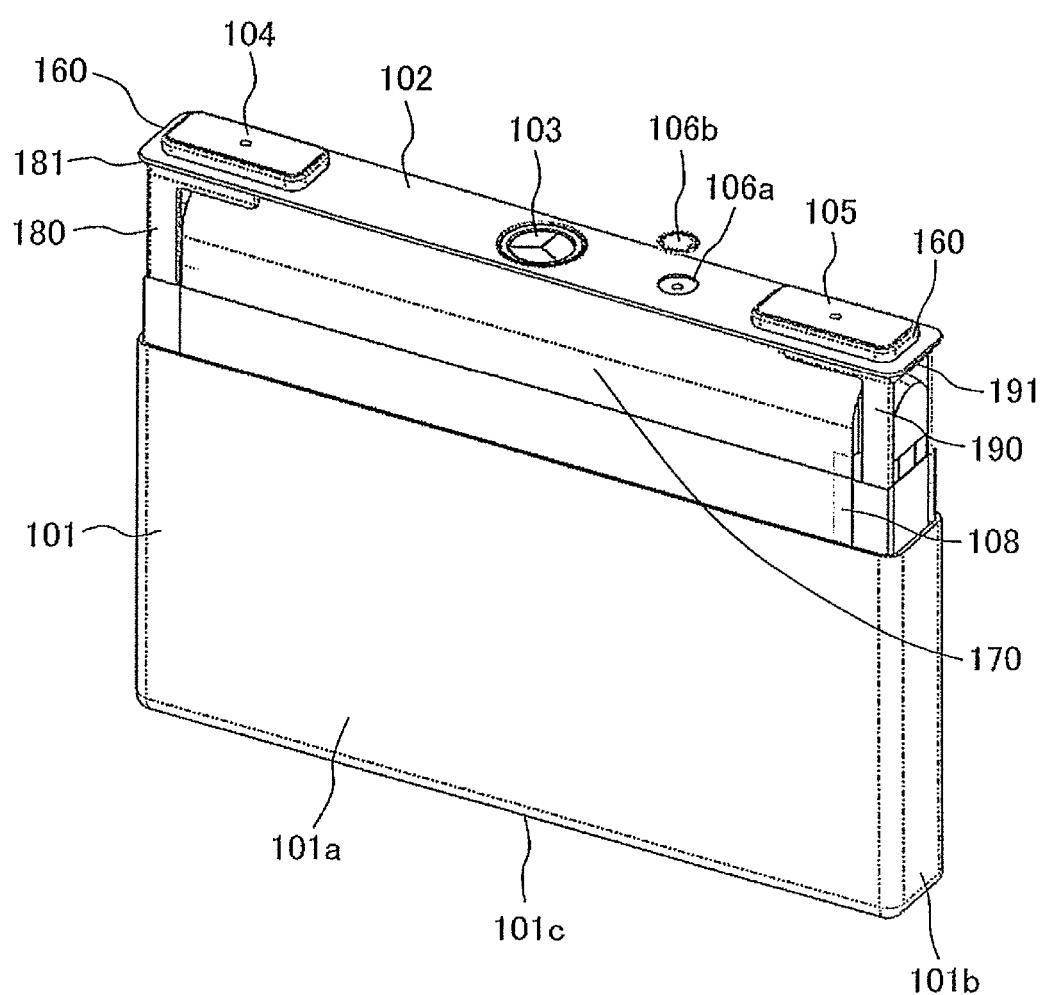
FIG. 2 is an exploded perspective view showing the configuration of the square secondary battery.

FIG. 1 is an appearance perspective view of a square secondary battery 100 as an embodiment of the square secondary battery, and FIG. 2 is an exploded perspective view showing the configuration of the square secondary battery 100.

As shown in FIG. 1, the square secondary battery 100 includes a battery container made of a battery can 101 and a battery lid 102. The material of the battery can 101 and the battery lid 102 is aluminum, an aluminum alloy or the like. The battery can 101 is formed in a flat rectangular box shape whose one end is open by performing deep drawing. The battery can 101 includes a base plate 101c in a rectangular flat plate shape, a pair of wide-width side plates 101a rising from a pair of long sides of the base plate 101c, and a pair of narrow-width side plates 101b rising from a pair of short sides of the base plate 101c.

As shown in FIG. 2, a wound electrode group 170 (see FIG. 3) held by a lid assembly 107 (see FIG. 4) is housed in the battery can 101. A positive electrode current collector 180 joined with a positive electrode 174 (see FIG. 3) of the wound electrode group 170 and joined with a negative electrode 175 (see FIG. 3) of the wound electrode group 170. A negative electrode current collector 190 and the wound electrode group 170 are housed in the battery can 101 by being covered with an insulating case 108. The material of the insulating case 108 is a resin having insulating properties such as polypropylene and the battery can 101 and the wound electrode group 170 are electrically insulated.

As shown in FIGS. 1 and 2, the battery lid 102 has a rectangular flat plate shape and is laser-welded like blocking an opening of the battery can 101. That is, the battery lid 102 seals the battery can 101. In the battery lid 102, as shown in FIG. 1, a positive electrode external terminal 104 and a negative electrode external terminal 105 electrically connected to the positive electrode 174 and the negative electrode 175 (see FIG. 3) of the wound electrode group 170 respectively are arranged.

As shown in FIG. 2, the positive electrode external terminal 104 is electrically connected to the positive electrode 174 (see FIG. 3) of the wound electrode group 170 via the positive electrode current collector 180 and the negative electrode external terminal 105 is electrically connected to the negative electrode 175 (see FIG. 3) of the wound electrode group 170 via the negative electrode current collector 190. Thus, power is supplied to an external device via the positive electrode external terminal 104 and the negative electrode external terminal 105 or externally generated power is supplied to the wound electrode group 170 via the positive electrode external terminal 104 and the negative electrode external terminal 105 for charging.

As shown in FIG. 2, the battery lid 102 has an injection hole 106a to inject an electrolytic solution into the battery container drilled therein. The injection hole 106a is sealed with an injection tap 106b after the electrolytic solution being injected. As the electrolytic solution, for example, a nonaqueous electrolytic solution in which lithium salt such as lithium hexafluorophosphate (LiPF6) is dissolved in a carbonate based organic solvent such as ethylene carbonate can be used.

The battery lid 102 is provided with a gas exhaust valve 103. The gas exhaust valve 103 is formed by partially thinning the battery lid 102 by press working. Incidentally, a thin-film member may be mounted in an opening of the battery lid 102 to use a thin portion as the gas exhaust valve. The gas exhaust valve 103 reduces the pressure inside the battery container by cleaving when the pressure inside the battery container rises and reaches a predetermined pressure after the square secondary battery 100 is heated due to an abnormal condition such as an internal short-circuit and a gas is generated and allowing the gas to be exhausted from inside.

Figure 3:
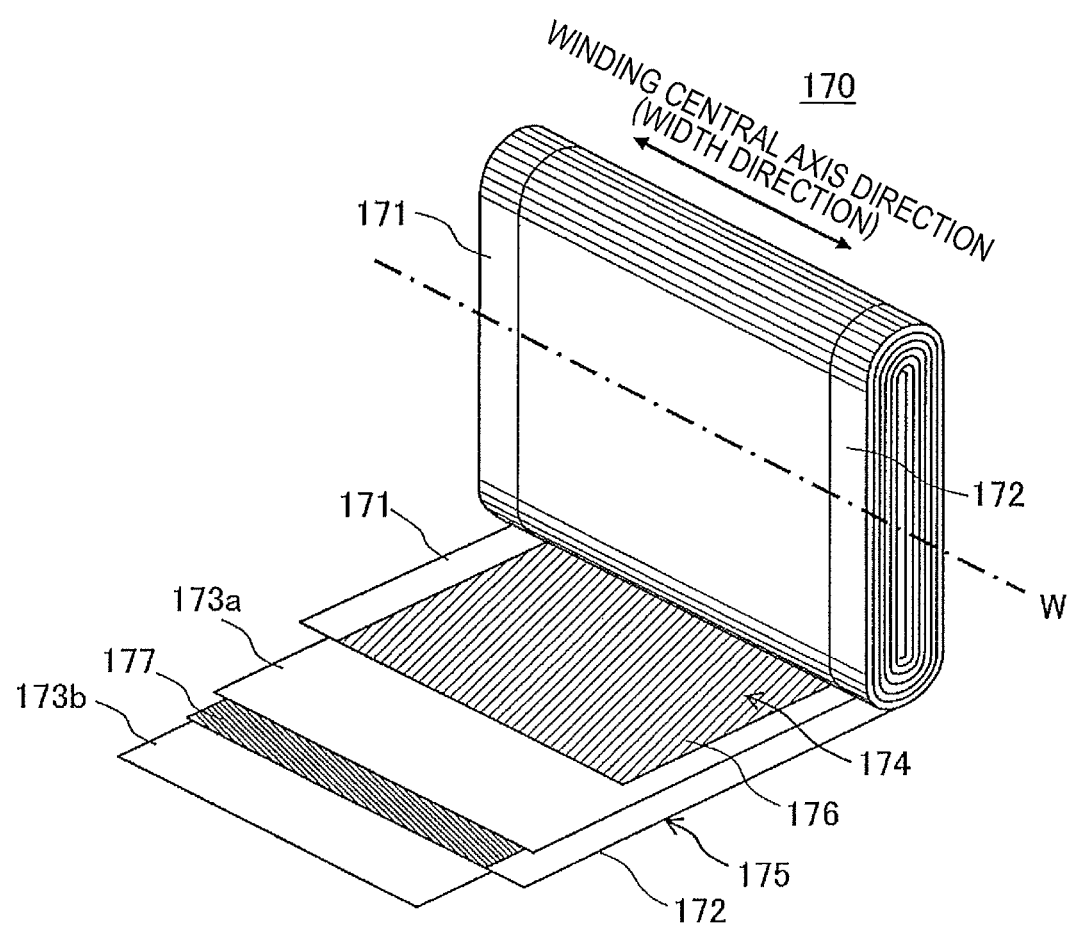
FIG. 3 is a perspective view showing a wound electrode group.

The wound electrode group 170 will be described with reference to FIG. 3. FIG. 3 is a perspective view showing the wound electrode group 170 and shows a state in which the winding end side of the wound electrode group 170 is expanded. The wound electrode group 170 as a power generation element is formed in a laminated structure by winding the positive electrode 174 and the negative electrode 175 of continuous lengths around a winding central axis W in a flat shape with separators 173a, 173b interposed therebetween.

The positive electrode 174 is produced by forming a layer 176 of a positive electrode active material mixture on both sides of positive electrode foil 171. The positive electrode active material mixture is prepared by adding a binder to a positive electrode active material. The negative electrode 175 is produced by forming a layer 177 of a negative electrode active material mixture on both sides of negative electrode foil 172. The negative electrode active material mixture is prepared by adding a binder to a negative electrode active material.

The positive electrode foil 171 is aluminum foil of about 20 to 30 μm in thickness and the negative electrode foil 172 is copper foil of about 15 to 20 μm in thickness. The raw material of the separators 173a, 173b is a fine porous polyethylene resin through which lithium ions can pass. The positive electrode active material is lithium containing transition metal composite oxide such as lithium manganate and the negative electrode active material is a carbon material such as graphite capable of reversibly occluding and releasing lithium ions.

One of both ends in the width direction of the wound electrode group 170, that is, one of both ends in a direction of a winding central axis W perpendicular to the winding direction is a laminated portion of the positive electrode 174 and the other is a laminated portion of the negative electrode 175. The laminated portion of the positive electrode 174 provided on one end is formed by laminating a positive electrode non-coated portion where the positive electrode active material mixture layer 176 is not formed, that is, an exposed portion of the positive electrode foil 171. The laminated portion of the negative electrode 175 provided on the other end is formed by laminating a negative electrode non-coated portion where the negative electrode active material mixture layer 177 is not formed, that is, an exposed portion of the negative electrode foil 172. The laminated portion of the positive electrode non-coated portion and the laminated portion of the negative electrode non-coated portion are each crushed in advance and connected to the positive electrode current collector 180 and the negative electrode current collector 190 of the lid assembly 107 (see FIG. 4) described below by ultrasonic welding respectively to form an electrode group assembly 109 (see FIG. 2).

Figure 4:
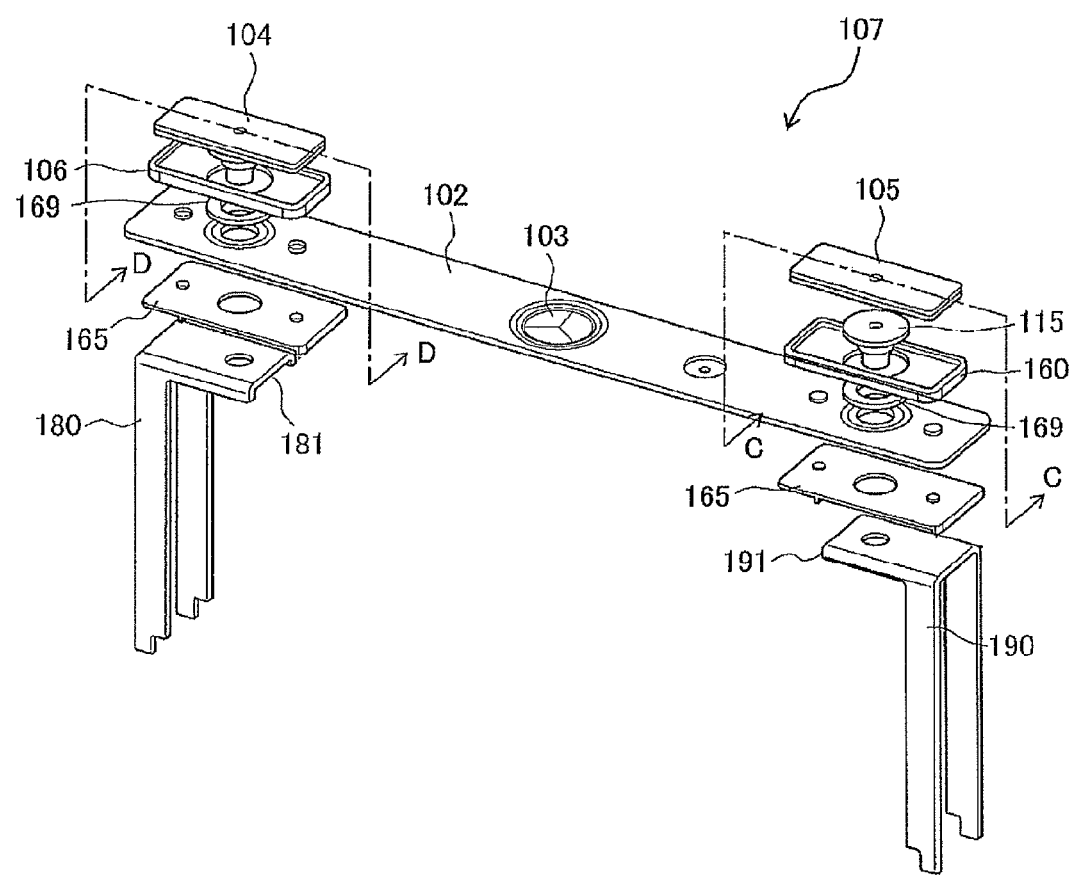
FIG. 4 is an exploded perspective view showing a lid assembly.
Figure 5A:
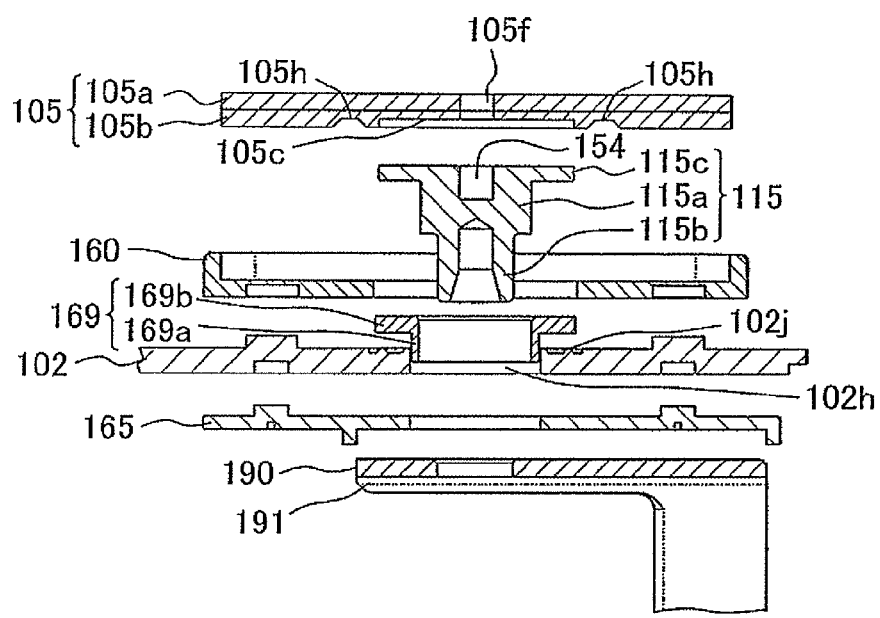
FIG. 5A is an exploded view showing the configuration of a negative electrode side of the lid assembly as a sectional view.
Figure 5B:
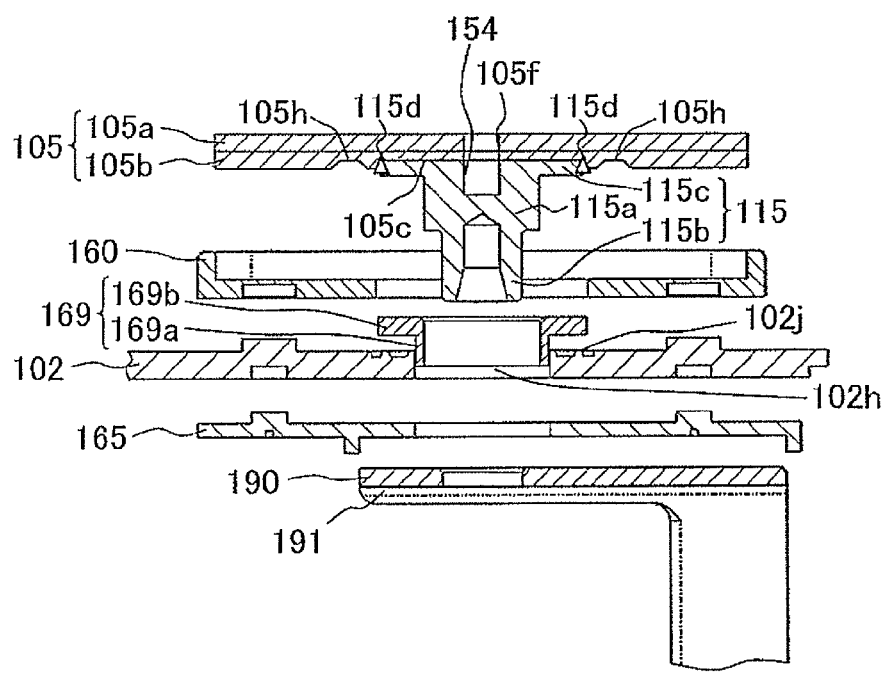
FIG. 5B is an exploded view showing the configuration of the negative electrode side of the lid assembly as a sectional view.
Figure 5C:
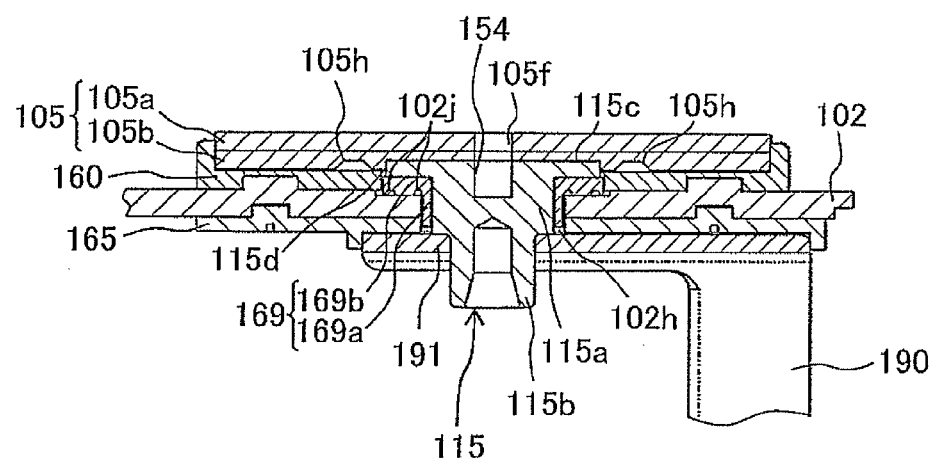
FIG. 5C is an assembly diagram showing the configuration of the negative electrode side of the lid assembly as a sectional view.
Figure 5D:
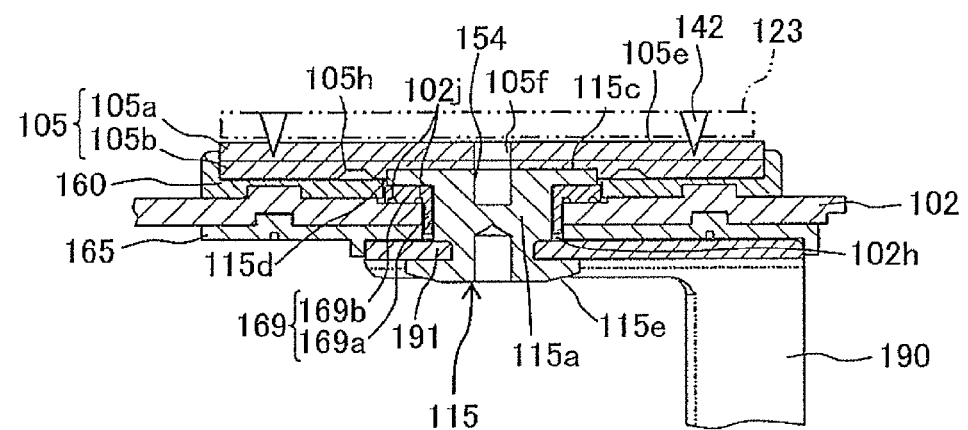
FIG. 5D is an assembly diagram showing the configuration of the negative electrode side of the lid assembly as a sectional view.

The configuration of the lid assembly 107 will be described in detail with reference to FIGS. 4, 5A to 5D, and 6A to 6C. FIG. 4 is an exploded perspective view showing the lid assembly 107 and FIGS. 5A to 5D are sectional views showing the configuration of a negative electrode side of the lid assembly 107. FIG. 5A is a sectional view taken along C-C line in FIG. 4. FIG. 5B is a sectional view showing a state in which the negative electrode external terminal 105 made of an aluminum alloy and a copper alloy and a negative electrode connection terminal 115 are assembled. FIG. 5C is a sectional view showing a state in which constituent members of the lid assembly 107 are assembled and shows a state before a tip portion 115b of an insertion shaft portion 115a is caulked. FIG. 5D is a sectional view taken along A-A line in FIG. 1 and shows a state after the tip portion 115b of the insertion shaft portion 115a is caulked.

Figure 6A:
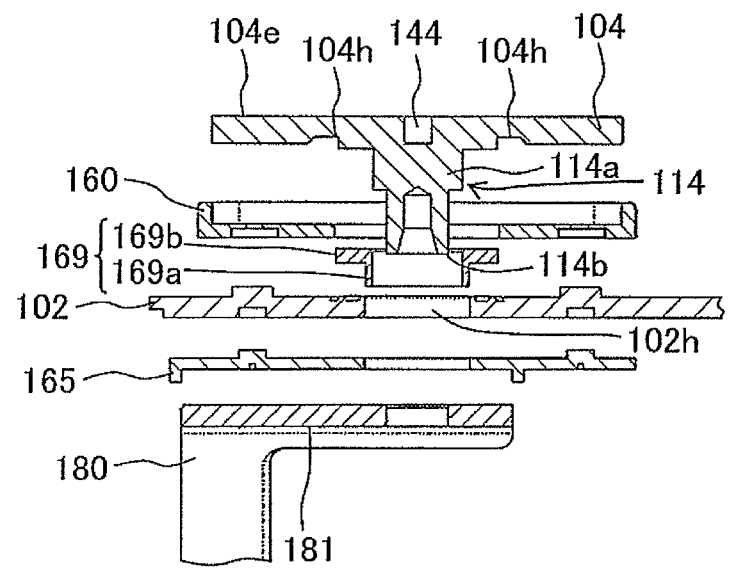
FIG. 6A is an exploded view showing the configuration of a positive electrode side of the lid assembly as a sectional view.
Figure 6B:
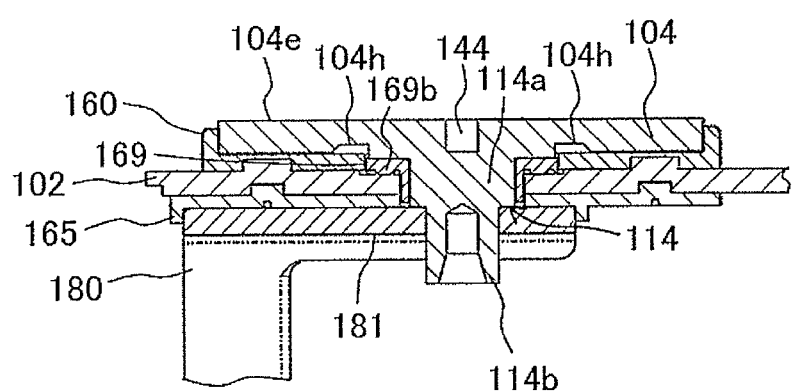
FIG. 6B is an assembly diagram showing the configuration of the positive electrode side of the lid assembly as a sectional view.
Figure 6C:
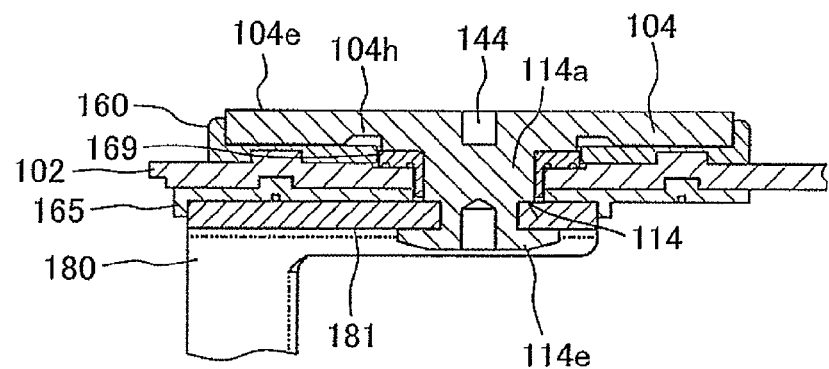
FIG. 6C is an assembly diagram showing the configuration of the positive electrode side of the lid assembly as a sectional view.

FIGS. 6A to 6C are sectional views showing the configuration of a positive electrode side of the lid assembly 107. FIG. 6A is a sectional view taken along D-D line in FIG. 4. FIG. 6B is a sectional view showing a state in which constituent members of the positive electrode side of the lid assembly 107 are assembled and shows a state before a tip portion 114b of an insertion shaft portion 114a is caulked. FIG. 6C is a sectional view taken along B-B line in FIG. 1 and shows a state after the tip portion 114b of the insertion shaft portion 114a is caulked.

As shown in FIG. 5A, the negative electrode side of the lid assembly 107 includes the battery lid 102, the negative electrode external terminal 105 provided on one end of the battery lid 102, the negative electrode connection terminal 115, an external insulator 160, an internal insulator 165, a gasket 169, and the negative electrode current collector 190.

FIG. 5B shows a diagram in which the negative electrode external terminal 105 and the negative electrode connection terminal 115 are integrated. The negative electrode external terminal 105 has a rectangular flat plate shape arranged along the top surface of the battery lid 102 and a bus bar joint surface 105e with which a bus bar 123 is joined by welding is formed on the top surface thereof. The negative electrode external terminal 105 is made of a clad material in which two flat plate portions made of mutually dissimilar metals are clad-joined on wide-width surfaces. In the present embodiment, the negative electrode external terminal 105 is formed of a flat clad material in which an aluminum alloy portion 105a (first alloy portion) and a copper alloy portion 105b (second alloy portion) having a flat plate shape are joined on wide-width surfaces as dissimilar metals and the copper alloy portion 105b is arranged on the battery lid 102 side and the aluminum alloy portion 105a is arranged on the side spaced from the battery lid 102. The negative electrode connection terminal 115 is electrically connected to the negative electrode external terminal 105 by laser welding. The negative electrode connection terminal 115 is joined by welding with the copper alloy portion 105b as a flat plate portion arranged on the battery lid 102 side of two flat plate portions of the negative electrode external terminal 105, that is, the aluminum alloy portion 105a and the copper alloy portion 105b. The material of the negative electrode connection terminal 115 is a copper alloy and the negative electrode connection terminal 115 and the negative electrode external terminal 105 are connected by laser welding of the same metal.

A negative electrode external terminal joint 105c to connect the negative electrode connection terminal 115 is provided in the center position in the longitudinal direction of the copper alloy portion 105b of the negative electrode external terminal 105. The negative electrode external terminal joint 105c is formed by being recessed in the copper alloy portion 105b and constituted by a circular recess having a fixed diameter and a predetermined depth.

The negative electrode connection terminal 115 is laser-welded while an end face thereof is fitted into the negative electrode external terminal joint 105c. The negative electrode connection terminal 115 includes the insertion shaft portion 115a in a round bar shape, a flange portion 115c whose diameter is expanded on the end face of the insertion shaft portion 115a, and the tip portion 115b in a cylindrical shape whose diameter is reduced at the tip of the insertion shaft portion 115a. The negative electrode external terminal joint 105c has a depth half the thickness of the flange portion 115c and a hole diameter in which the inner circumferential surface thereof faces the outer circumferential surface of the flange portion 115c. The negative electrode connection terminal 115 and the negative electrode external terminal 105 are mutually joined by the flange portion 115c of the negative electrode connection terminal 115 being fitted into the negative electrode external terminal joint 105c of the negative electrode external terminal 105 and a boundary portion of the outer circumferential surface of the flange portion 115c and the inner circumferential surface of the negative electrode external terminal joint 105c being laser-welded continuously all around the circumference. Then, a welded portion 115d is formed in the joined portion (see FIG. 9B).

The negative electrode external terminal 105 has a pair of concave grooves 105h extending in a short-side direction in both side positions in the longitudinal direction of the negative electrode external terminal joint 105c of the copper alloy portion 105b. The pair of concave grooves 105h is provided in a position between a welding portion (not shown) where the bus bar 123 is welded to the bus bar joint surface 105e of the negative electrode external terminal 105 and the negative electrode external terminal joint 105c and when a force acts on the negative electrode external terminal 105 from the bus bar 123 (see FIG. 5D), the force is absorbed by the concave grooves 105h being actively bent to limit the deformation of the gasket 169.

The gasket 169 includes a cylindrical portion 169a of a minor axis fitted into the insertion shaft portion 115a of the negative electrode connection terminal 115 at the outside thereof and a collar portion 169b expanding in a radial direction in an end face portion of the cylindrical portion 169a.

Next, FIG. 5C is a sectional view showing a state in which constituent members of the negative electrode side of the lid assembly 107 are assembled and shows a state before the tip portion 115b is caulked. As shown in FIG. 5B, the negative electrode external terminal 105 and the negative electrode connection terminal 115 integrated by laser welding are electrically connected to the negative electrode current collector 190 by the insertion shaft portion 115a being inserted into an insertion hole opened in a bearing surface portion 191 of the negative electrode current collector 190, the tip portion 115b being expanded in diameter and then caulked, and further a caulking portion 115e being laser-welded 142. The negative electrode connection terminal 115 is mounted on the battery lid 102 via the external insulator 160 and the gasket 169. The negative electrode current collector 190 is mounted on the battery lid 102 via the internal insulator 165.

The material of the external insulator 160 and the internal insulator 165 is a resin having insulating properties such as polypropylene (PP). The material of the gasket 169 is a resin having insulating properties such as tetrafluoroethylene-perfluoroalkylvinyl ether copolymer (PFA).

FIG. 5D is a sectional view showing a state in which constituent members of the negative electrode side of the lid assembly 107 are assembled and shows a state after the tip portion 115b is caulked. The negative electrode connection terminal 115 is inserted into a through hole 102h of the battery lid 102 and a through hole of the internal insulator 165 while the gasket 169 is fitted into the insertion shaft portion 115a at the outside thereof. As illustrated in FIG. 5D, a step portion formed between the insertion shaft portion 115a and the tip portion 115b is brought into contact with the bearing surface portion 191 and the tip of the tip portion 115b is expanded in diameter while the collar portion 169b of the gasket 169 is sandwiched between the flange portion 115c and an external surface of the battery lid 102 and caulked by the bearing surface portion 191 to form the caulking portion 115e.

Two convex portions 102j to form seal points with the gasket 169 are provided on the top surface of the battery lid 102. The two convex portions 102j are provided in positions opposite to the collar portion 169b of the gasket 169 and have a circumferentially continuous shape around the same position as the center of the respective through holes 102h. Seal points are formed by the collar portions 169b of the gasket 169 being pressed against the two convex portions for sealing.

FIGS. 6A to 6C show the lid assembly 107 of the positive electrode side.

As shown in FIG. 6A, the positive electrode side of the lid assembly 107 includes the battery lid 102, the positive electrode external terminal 104 provided on one end of the battery lid 102, a positive electrode connection terminal 114, the external insulator 160, the internal insulator 165, the gasket 169, and the positive electrode current collector 180. The positive electrode external terminal 104 has a rectangular flat plate shape arranged along the top surface of the battery lid 102 and a bus bar joint surface 104e with which the bus bar 123 is joined by welding is formed on the top surface thereof. The positive electrode connection terminal 114 is formed integrally with the positive electrode external terminal 104. The positive electrode connection terminal 114 includes the insertion shaft portion 114a in a round bar shape protruding from an undersurface of the positive electrode external terminal 104 and the tip portion 114b in a cylindrical shape whose diameter is reduced at the tip of the insertion shaft portion 114a.

The positive electrode external terminal 104 has a pair of concave grooves 104h extending in a short-side direction in both side positions in the longitudinal direction of the positive electrode connection terminal 114. The pair of concave grooves 104h is provided in a position between a welding portion (not shown) where the bus bar 123 is welded to the bus bar joint surface 104e of the positive electrode external terminal 104 and the positive electrode connection terminal 114 and when a force acts on the positive electrode external terminal 104 from the bus bar 123 (see FIG. 5D), the force is absorbed by the concave grooves 104h being actively bent to limit the deformation of the gasket 169.

FIG. 6B is a sectional view showing a state in which constituent members of the positive electrode side of the lid assembly 107 are assembled and shows a state before the tip portion 104b is caulked.

For the electrical connection of the positive electrode external terminal 104 and the positive electrode connection terminal 114, the insertion shaft portion 114a of the positive electrode connection terminal 114 is inserted into an insertion hole opened in the bearing surface portion 181 of the positive electrode current collector 180 and the tip portion 114b protruding from the insertion hole is expanded in diameter to form a caulking portion 114e. Then, the caulking portion 114e is further laser-welded (not shown) to the bearing surface portion 181 to electrically connect the positive electrode external terminal 104 and the positive electrode connection terminal 114 to the positive electrode current collector 180. The positive electrode connection terminal 114 is mounted on the battery lid 102 via the external insulator 160 and the gasket 169. The positive electrode current collector 180 is mounted on the battery lid 102 via the internal insulator 165. The material of the external insulator 160 and the internal insulator 165 is a resin having insulating properties such as polypropylene (PP). The material of the gasket 169 is a resin having insulating properties such as tetrafluoroethylene-perfluoroalkylvinyl ether copolymer (PFA).

FIG. 6C is a sectional view showing a state in which constituent members of the positive electrode side of the lid assembly 107 are assembled and shows a state after the tip portion 114b is caulked. The positive electrode connection terminal 114 is inserted into the through hole 102h of the battery lid 102 and the through hole of the internal insulator 165 while the gasket 169 is fitted into the insertion shaft portion 114a at the outside thereof. As illustrated in FIG. 6C, a step portion formed between the insertion shaft portion 114a and the tip portion 114b is brought into contact with the bearing surface portion 181 and the tip of the tip portion 114b is expanded in diameter while the collar portion 169b of the gasket 169 is sandwiched between the positive electrode external terminal 104 and the external surface of the battery lid 102 and caulked by the bearing surface portion 181 to form the caulking portion 114e.

The caulking process will be described with reference to FIGS. 7A and 7B. The caulking process of the caulking portion 114e for the bearing surface portion 181 of the positive electrode current collector 180 and the caulking process of the caulking portion 115e for the bearing surface portion 191 of the negative electrode current collector 190 are similar and thus, the caulking process on the negative electrode side will representatively be described.

Figure 7A:
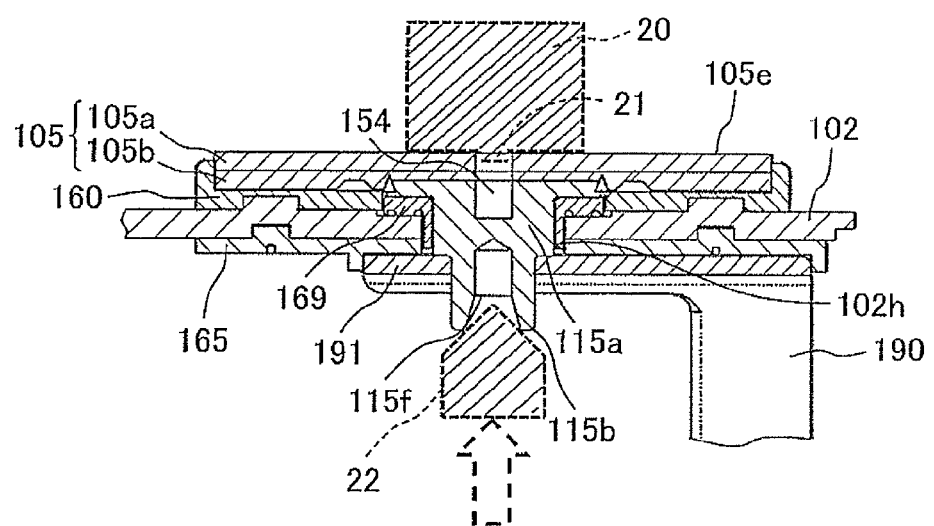
FIG. 7A is a diagram showing a process of caulking the tip of a current collector joint of a negative electrode external terminal to a current collector.
Figure 7B:
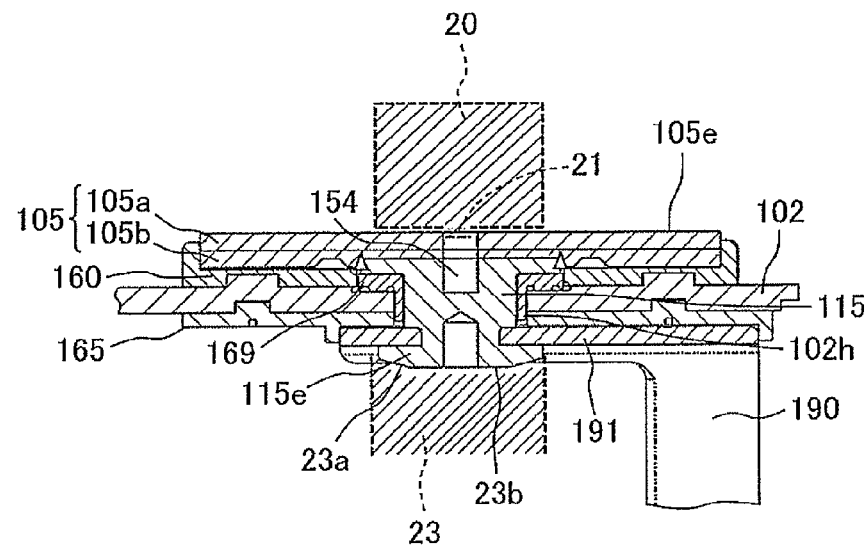
FIG. 7B is a diagram showing the process of caulking the tip of the current collector joint of the negative electrode external terminal to the current collector.

In the caulking process, as shown in FIG. 7A, the tip portion 115b in a cylindrical shape is pressed and widened by pressing a mold 22 with a tip in a conical shape into a caulking hole 115f on the inner side of the tip portion 115b while a flat surface portion of a mold 20 is in contact with the bus bar joint surface 105e as a caulking top surface portion. Accordingly, the negative electrode current collector 190, the negative electrode connection terminal 115, the negative electrode external terminal 105, the gasket 169, and the external insulator 160, and the internal insulator 165 are temporarily fixed to the battery lid 102.

The mold 20 of the caulking device is provided with a protrusion 21 in a pin shape and by inserting the protrusion 21 into a through hole 105f opened in the bus bar joint surface 105e to fit into a recess 154 formed on the end face surface of the negative electrode connection terminal 115, the negative electrode external terminal 105 and the negative electrode connection terminal 115 can be positioned easily and precisely with respect to the caulking device. Thus, the mold 22 with the tip in a conical shape of the caulking device can be pressed into the caulking hole 115f of the tip portion 115b in a cylindrical shape with precision.

The type of the mold 22 with the tip in a conical shape is sequentially replaced with one having a larger tip angle and pressed into the caulking hole 115f of the tip portion 115b to gradually widen the tip portion 115b to the outer side. As shown in FIG. 7B, the caulking portion 115e in an annular shape in plan view is formed by pressing a mold 23 having a flat surface portion 23a parallel to the battery lid 102 and having a circular shape in plan view and an inclined portion 23b inclined from the flat surface portion 23a toward the battery lid 102 and having an annular shape in plan view against the tip portion 115b. Accordingly, the negative electrode current collector 190, the negative electrode external terminal 105, the gasket 169, and the external insulator 160, and the internal insulator 165 are tightened and fixed to the battery lid 102 for integration. Similarly, with the caulking portion 114e of the positive electrode connection terminal 114 being caulked to the bearing surface portion 181 of the positive electrode current collector 180, the positive electrode current collector 180, the positive electrode external terminal 104, the gasket 169, and the external insulator 160, and the internal insulator 165 are tightened and fixed to the battery lid 102 for integration.

The square secondary battery 100 is connected to another square secondary battery (not shown) by the bus bar 123 to constitute a battery module. In the present embodiment, the bus bar 123 indicated by an alternate long and two short dashes line in FIG. 5D is connected to the external terminals 104, 105 of the square secondary battery 100 by laser welding. The bus bar 123 is made of an aluminum alloy and connected to the positive electrode external terminal 104 and the negative electrode external terminal 105 by welding of aluminum alloys. Thus, the welding is that of the same metal, which makes joining easier and can suppress an increase of the contact resistance.

Figure 9A:
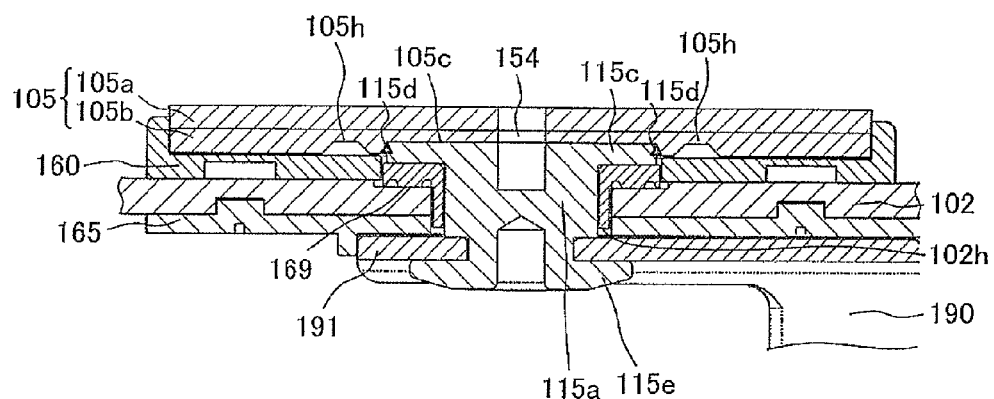
FIG. 9A is an assembly diagram showing an example of a welded fixing structure of the negative electrode external terminal and the negative electrode connection terminal as a sectional view.
Figure 9B:
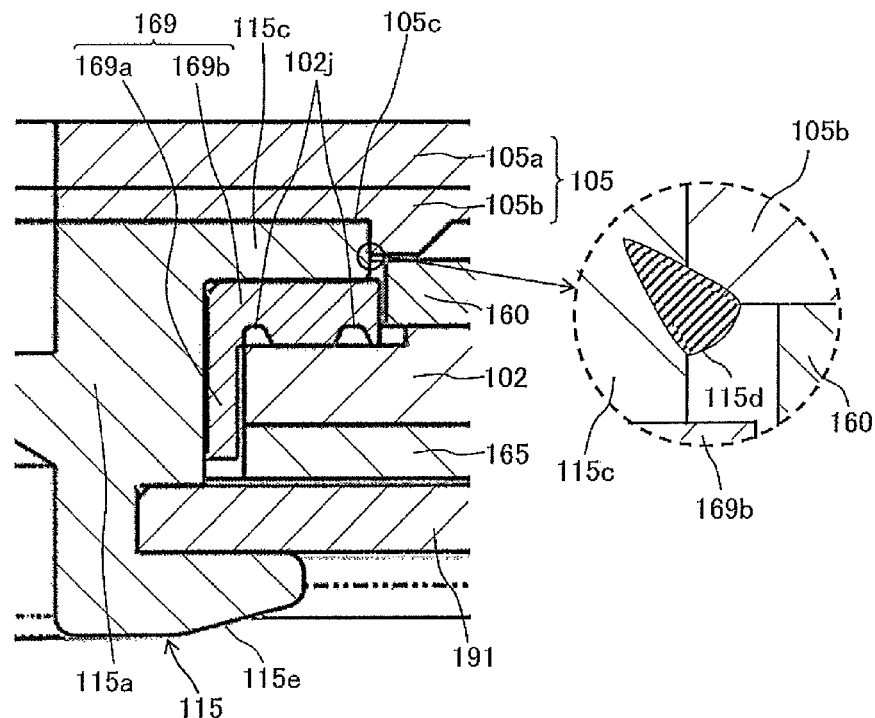
FIG. 9B is an enlarged view of principal portions of FIG. 9A.

FIG. 9A is an assembly diagram showing an example of a welded fixing structure of the negative electrode external terminal and the negative electrode connection terminal as a sectional view and FIG. 9B is an enlarged view of principal portions of FIG. 9A.

As described above, the negative electrode external terminal 105 has the negative electrode external terminal joint 105c made of a recess in the copper alloy portion 105b on the undersurface side thereof and the flange portion 115c of the negative electrode connection terminal 115 is fitted thereinto. The depth of the negative electrode external terminal joint 105c is shallower than the thickness width of the flange portion 115c of the negative electrode connection terminal 115 and the end face side of the flange portion 115c is fitted into the negative electrode external terminal joint 105c so that the tip side of the flange portion 115c protrudes from the copper alloy portion 105b.

Then, fillet welding is performed by irradiating a boundary portion between the outer circumferential surface of the flange portion 115c and the undersurface of the copper alloy portion 105b with a laser beam for laser welding from an oblique direction to form the welded portion 115d.

The welded portion 115d is arranged in a position on the outer side in the radial direction of the negative electrode connection terminal 115 from the seal point of the gasket 169. Then, the external insulator 160 is arranged in a position further on the outer side in the radial direction from the welded portion 155d. Therefore, a leak path can be prevented from being formed between the top surface of the battery lid 102 and the collar portion 169b of the gasket 169 so that a high level of airtightness can be obtained.

According to the welded fixing configuration described above, the end face side of the flange portion 115c is fitted into the negative electrode external terminal joint 105c and thus, if, for example, a force in a flat surface direction acts on the negative electrode external terminal 105 due to the bus bar 123, the force can be resisted and a high level of mechanical strength can be obtained.

The negative electrode external terminal 105 has a substantially rectangular shape in plan view extending in a direction moving away from the negative electrode connection terminal 115 and thus, the bus bar 123 that is wider can be joined. Therefore, the location where the bus bar 123 is welded can be separated from the negative electrode connection terminal 115 and the gasket 169 can be prevented from being affected by heat of welding. Then, when a battery module is formed, the distance between neighboring square secondary batteries can be shortened and the electric resistance thereof can be reduced. When, for example, a force acts in a direction vertically lifting the negative electrode external terminal 105 by the bus bar 123, the distance from the negative electrode connection terminal 115 to the location where the bus bar 123 is welded on the bus bar joint surface 105e can be secured longer with respect to the amount of deformation of the negative electrode external terminal 105.

Figure 10A:
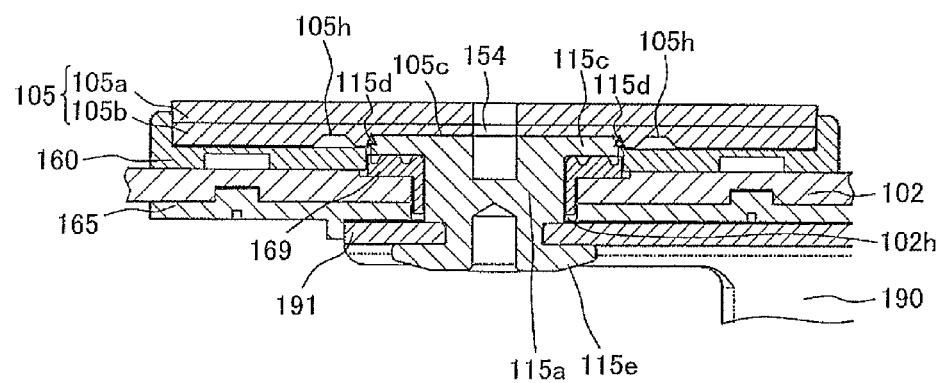
FIG. 10A is an assembly diagram showing an example of the welded fixing structure of the negative electrode external terminal and the negative electrode connection terminal as a sectional view.
Figure 10B:
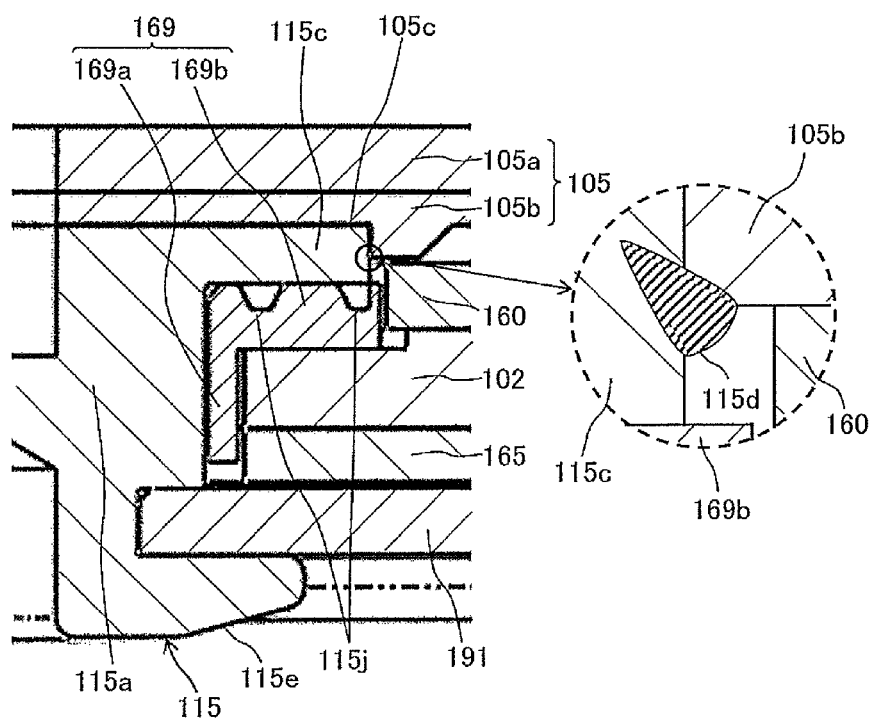
FIG. 10B is an enlarged view of principal portions of FIG. 10A.

FIG. 10A is an assembly diagram showing another example of the welded fixing structure of the negative electrode external terminal and the negative electrode connection terminal as a sectional view and FIG. 10B is an enlarged view of principal portions of FIG. 10A.

In the structure example shown in FIGS. 10A and 10B, the seal point is provided between the collar portion 169b of the gasket 169 and the flange portion 115c of the negative electrode connection terminal 115. Two convex portions 115j that are circumferentially continuous around the same position as the center of the insertion shaft portion 115a are provided on the undersurface of the flange portion 115c and seal points are formed by the collar portions 169b of the gasket 169 being pressed against the two convex portions 115j for sealing. Therefore, a leak path can be prevented from being formed between the flange portion 115c of the negative electrode connection terminal 115 and the collar portion 169b of the gasket 169 so that a high level of airtightness can be obtained.

Figure 11A:
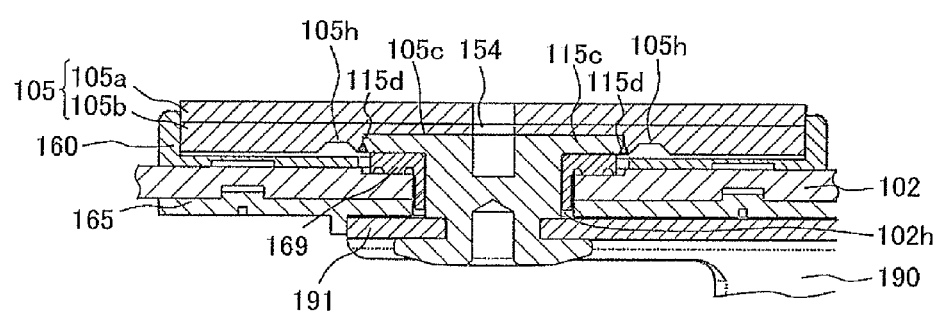
FIG. 11A is an assembly diagram showing an example of the welded fixing structure of the negative electrode external terminal and the negative electrode connection terminal as a sectional view.
Figure 11B:
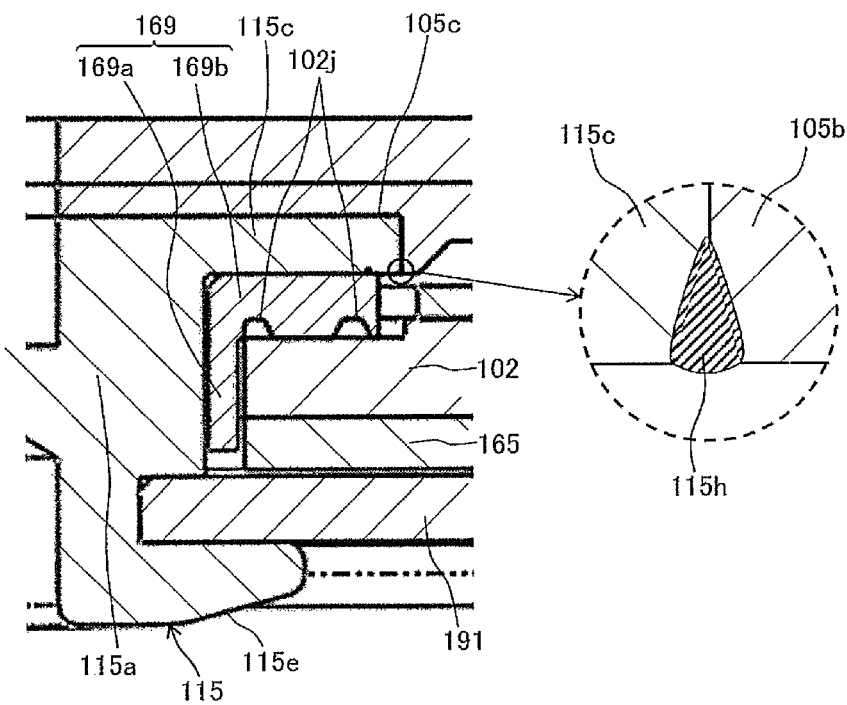
FIG. 11B is an enlarged view of principal portions of FIG. 11A.

FIG. 11A is an assembly diagram showing still another example of the welded fixing structure of the negative electrode external terminal and the negative electrode connection terminal as a sectional view and FIG. 11B is an enlarged view of principal portions of FIG. 11A.

The negative electrode external terminal 105 has the negative electrode external terminal joint 105c made of a recess in the copper alloy portion 105b on the undersurface side thereof and the flange portion 115c of the negative electrode connection terminal 115 is fitted thereinto. The depth of the negative electrode external terminal joint 105c is the same as the thickness width of the flange portion 115c of the negative electrode connection terminal 115 and the flange portion 115c and the copper alloy portion 105b are flush with each other while the flange portion 115c is fitted into the negative electrode external terminal joint 105c and fixed.

Then, groove welding is performed by irradiating a boundary portion between the outer circumferential surface of the flange portion 115c and the inner circumferential surface of the negative electrode external terminal joint 105c with a laser beam for laser welding in a direction parallel to an axial direction of the insertion shaft portion 115a to form a welded portion 115h.

The battery lid 102 is provided with the two convex portions 102j to form a seal point facing the gasket 169. The two convex portions 102j are provided in positions opposite to the collar portion 169b of the gasket 169 and have a circumferentially continuous shape around the same position as the center of the respective through holes 102h. Seal points are formed by the collar portions 169b of the gasket 169 being pressed against the two convex portions for sealing.

The welded portion 115d is arranged in a position on the outer side in the radial direction moving away from the insertion shaft portion 115a of the negative electrode connection terminal 115 from the seal point of the gasket 169. Then, the external insulator 160 is arranged in a position further on the outer side in the radial direction from the welded portion 155d. Therefore, a leak path can be prevented from being formed between the top surface of the battery lid 102 and the collar portion 169b of the gasket 169 so that a high level of airtightness can be obtained.

Figure 12A:
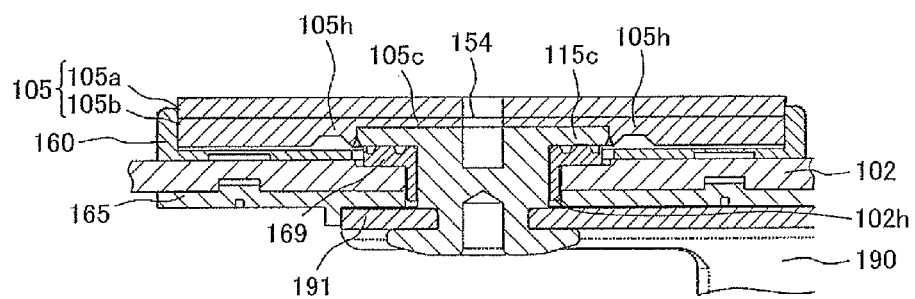
FIG. 12A is an assembly diagram showing an example of the welded fixing structure of the negative electrode external terminal and the negative electrode connection terminal as a sectional view.
Figure 12B:
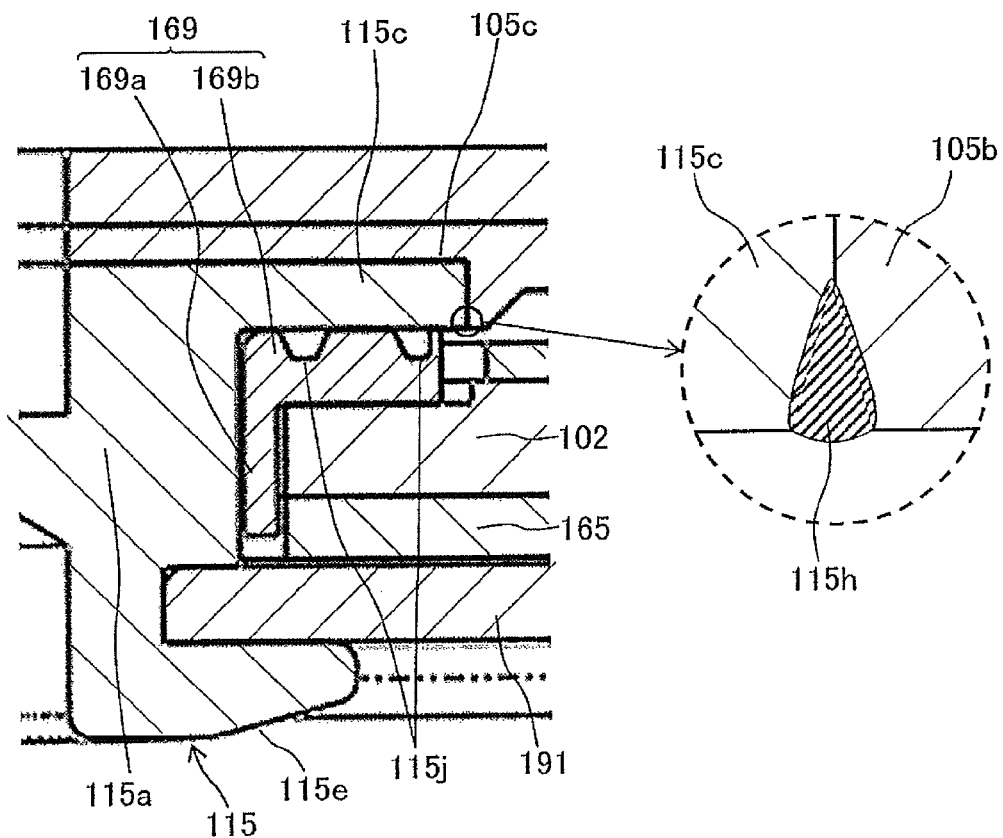
FIG. 12B is an enlarged view of principal portions of FIG. 12A.

FIG. 12A is an assembly diagram showing still another example of the welded fixing structure of the negative electrode external terminal and the negative electrode connection terminal as a sectional view and FIG. 12B is an enlarged view of principal portions of FIG. 12A.

In the structure example shown in FIGS. 12A and 12B, compared with the structure command shown in FIGS. 11A and 11B, the position of the seal point is different and the seal point is provided between the collar portion 169b of the gasket 169 and the flange portion 115c of the negative electrode connection terminal 115. Two convex portions 115j that are circumferentially continuous around the same position as the center of the insertion shaft portion 115a are provided on the undersurface of the flange portion 115c and seal points are formed by the collar portions 169b of the gasket 169 being pressed against the two convex portions 115j for sealing. Then, the welded portion 115d is arranged in a position on the outer side in the radial direction moving away from the insertion shaft portion 115a of the negative electrode connection terminal 115 from the seal point of the gasket 169 and the external insulator 160 is arranged on a position further on the outer side in the radial direction from the welded portion 155d. Therefore, a leak path can be prevented from being formed between the flange portion 115c of the negative electrode connection terminal 115 and the collar portion 169b of the gasket 169 so that a high level of airtightness can be obtained.

Second Embodiment

In the first embodiment described above, the configuration in which the negative electrode external terminal 105 and the negative electrode connection terminal 115 are integrated by laser welding is taken as an example, but the negative electrode external terminal 105 and the negative electrode connection terminal 115 may be fixed by caulking and further laser-welded. FIG. 8 shows an assembly form thereof.

Figure 8A:
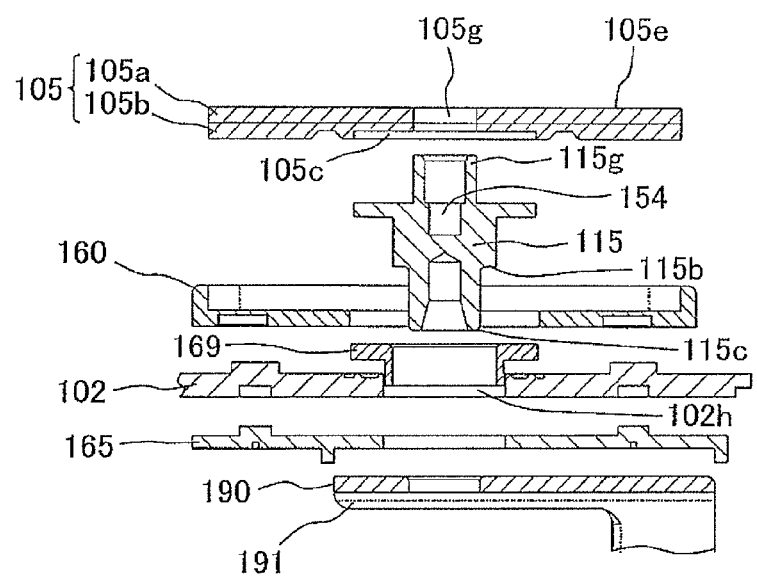
FIG. 8A is an exploded view showing a caulking structure of the negative electrode external terminal and a negative electrode connection terminal as a sectional view.
Figure 8B:
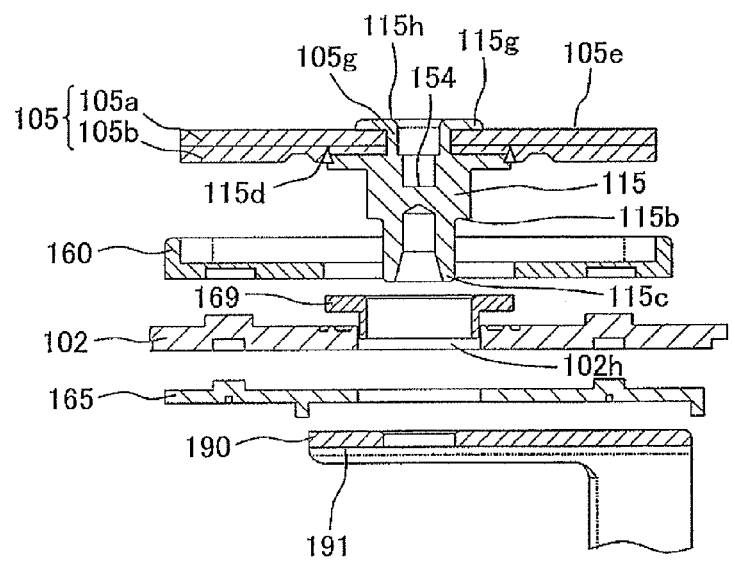
FIG. 8B is an exploded view showing a caulked fixing structure of the negative electrode external terminal and the negative electrode connection terminal as a sectional view.

FIG. 8A shows a state before an end face portion 115g of the negative electrode connection terminal 115 is caulked and FIG. 8B shows a state after the end face portion 115g is caulked.

The negative electrode connection terminal 115 has the end face portion 115g inserted into the through hole 105g of the negative electrode external terminal 105. Then, like the caulking process shown in FIGS. 7A and 7B, the negative electrode connection terminal 115 is fixed by caulking to an exposed surface positioned outer side of the battery can 1 of the negative electrode external terminal 105. After the negative electrode external terminal 105 and the negative electrode connection terminal 115 are fixed by caulking, the boundary portion between the outer circumferential surface of the flange portion 115c and the copper alloy portion 105b of the negative electrode external terminal 105 is laser-welded continuously all around the flange portion 115c in the form shown in FIG. 5B for electric connection.

According to the present embodiment described above, the operation/working effect as described below can be achieved.

According to the present invention, a square secondary battery whose external terminal is formed in a simple structure and which reduces the connection resistance of a connection terminal and the external terminal made of a clad material and the connection resistance of the dissimilar metal change portion of the external terminal made of the clad material can be provided.

Insofar as features of the present invention are not spoiled, the present invention is not limited to the above embodiments and other forms conceived within the scope of technical ideas of the present invention are included in the scope of the present invention.

In the above embodiments, for example, a case when a clad material made of the aluminum alloy portion 105a and the copper alloy portion 105b is used for the negative electrode external terminal 105 and the bus bar 123 made of an aluminum alloy is connected is taken as an example, but, for example, a structure in which the negative electrode external terminal 105 is formed from a copper alloy, a clad material made of a copper alloy portion and an aluminum alloy portion is used for the positive electrode external terminal 104, and a bus bar made of the copper alloy is connected may also be adopted.

The seal point is preferably provided in at least one case of between the gasket 169 and the battery lid 102 and between the gasket 169 and the negative electrode connection terminal 115 and may also be provided in both cases.

REFERENCE SIGNS LIST

100 square secondary battery
101 can
102 lid
105 negative electrode external terminal (external terminal)
105a aluminum alloy portion (flat plate portion)
105b copper alloy portion (flat plate portion)
115 connection terminal
190 current collector

The invention claimed is:

1. A square secondary battery comprising:
   a power generation element including electrodes;
   a can housing the power generation element;
   a lid sealing an opening of the can;
   an external terminal arranged on the lid;
   a current collector connected to each of the electrodes of the power generation element; and
   a connection terminal connecting the current collector and the external terminal by passing through the lid, wherein
   the external terminal has a flat plate shape arranged along the lid and is made of a clad material in which two flat plate portions made of mutually different metals are clad-joined on wide-width surfaces and, of the flat plate portions, the flat plate portion arranged on a side of the lid is made of a same metal as that of the connection terminal,
   the connection terminal is joined by welding with, of the two flat plate portions of the external terminal, the flat plate portion arranged on the side of the lid,
   the external terminal includes an external terminal joint recessed in the flat plate portion arranged on the side of the lid, and
   the connection terminal is laser-welded while an end face thereof is fitted into the external terminal joint,
   wherein:
   the external terminal joint has a recess in a circular shape having a fixed diameter and a predetermined depth,
   the connection terminal includes an insertion shaft portion inserted into a through hole opened in the lid and a flange portion whose diameter is expanded on an end face of the insertion shaft portion, and
   the flange portion of the connection terminal is fitted into the recess of the external terminal joint and a boundary portion between an outer circumferential surface of the flange portion and an inner circumferential surface of the recess is laser-welded.

2. The square secondary battery according to claim 1, further comprising:
   a gasket interposed between the connection terminal and the lid,
   wherein a convex portion to form a seal point is provided on at least one of the connection terminal and the lid.

3. The square secondary battery according to claim 2, wherein the two alloy portions are an aluminum alloy portion and a copper alloy portion.

4. The square secondary battery according to claim 3, wherein
   the external terminal includes a positive electrode external terminal and a negative electrode external terminal,
   the connection terminal includes a positive electrode connection terminal and a negative electrode connection terminal,
   the negative electrode external terminal is made of the clad material having the aluminum alloy portion and the copper alloy portion and the copper alloy portion is arranged on the side of the lid, and
   the negative electrode connection terminal is made of a copper alloy and joined by welding with the copper alloy portion of the negative electrode external terminal.

5. The square secondary battery according to claim 4, wherein the negative electrode connection terminal is fixed by caulking to an exposed surface positioned on an outer side of the battery can of the negative electrode external terminal.

* * * * *